United States Patent [19]

Breault et al.

[11] 4,043,933

[45] Aug. 23, 1977

[54] METHOD OF FABRICATING A FUEL CELL ELECTRODE

[75] Inventors: Richard D. Breault, Coventry; Richard P. Harding, South Windsor; Fred S. Kemp, Ellington, all of Conn.

[73] Assignee: United Technologies Corporation, Hartford, Conn.

[21] Appl. No.: 696,335

[22] Filed: June 15, 1976

[51] Int. Cl.² ............................................. H01M 4/04
[52] U.S. Cl. ..................................... 252/182; 429/42
[58] Field of Search ................. 429/42; 427/126, 115; 252/182

[56] References Cited

U.S. PATENT DOCUMENTS

| 3,432,362 | 3/1969 | Kroll | 429/42 |
| 3,444,004 | 5/1969 | Smith | 429/42 |
| 3,676,222 | 7/1972 | Deibert | 429/42 |

*Primary Examiner*—John H. Mack
*Assistant Examiner*—H. A. Feeley
*Attorney, Agent, or Firm*—Stephen E. Revis

[57] ABSTRACT

A method of fabricating a fuel cell electrode comprising an electrocatalyst and binder wherein the colloidal chemistry of the aqueous catalyst and the binder suspension are controlled during the deposition of the catalyst/binder onto an electrode substrate. Control is by addition of acids, bases, or salts to an aqueous suspension of binder and catalyst to adjust the pH to within certain ranges to form a flocculate. The flocculate is then fabricated into an electrode. The catalyst/binder distribution within the electrode and electrochemical performance, including decay characteristics, of the electrode are improved.

11 Claims, 1 Drawing Figure

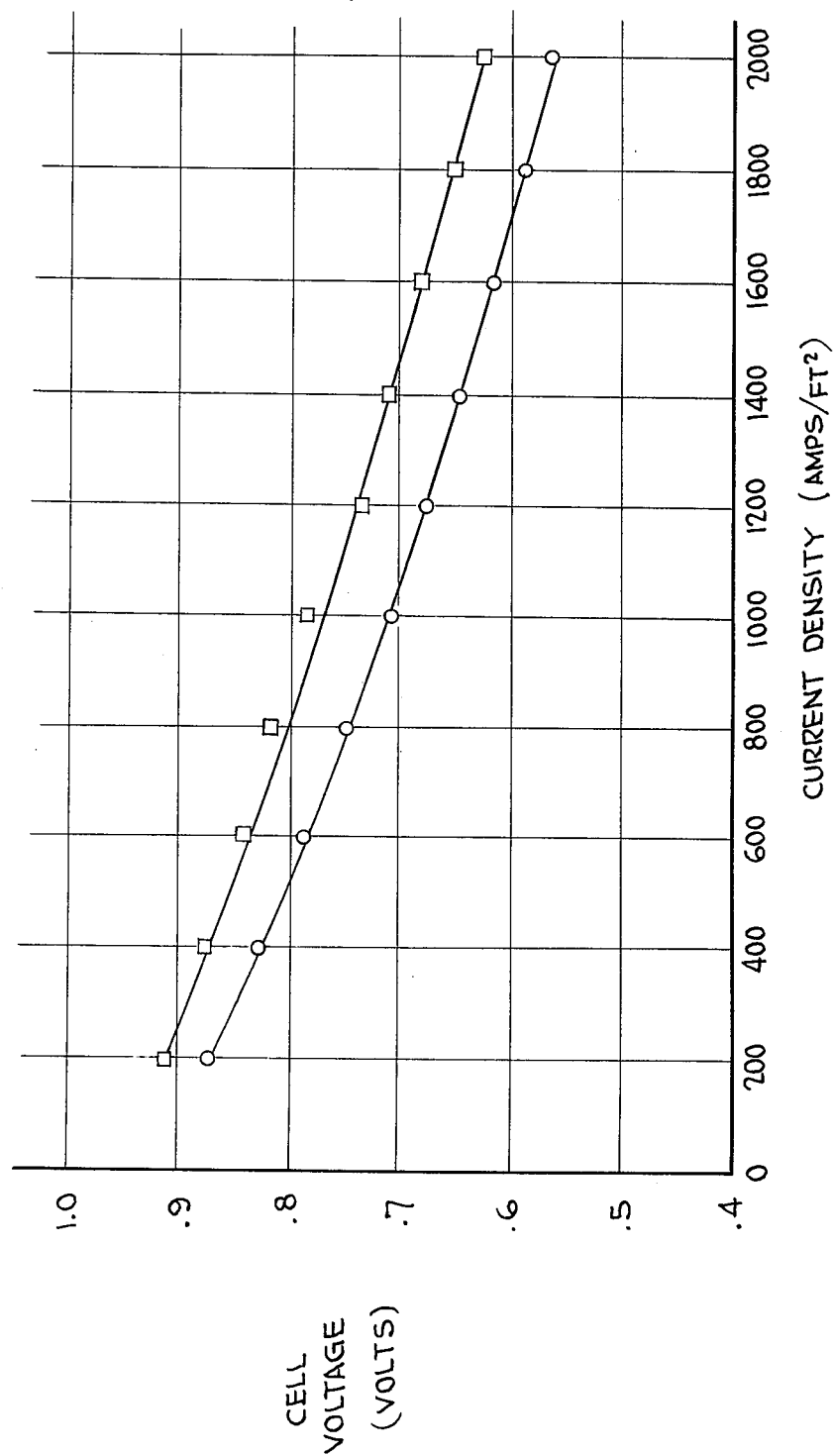

METHOD OF FABRICATING A FUEL CELL ELECTRODE

CROSS REFERENCE TO RELATED APPLICATION

The following application Ser. No. 696,334, filed on even date herewith and of common assignee with the present invention, describes and claims related subject matter: "Method of Fabricating a Fuel Cell Electrode" by Paul Stonehart and Gerda Kohlmayr.

FIELD OF INVENTION AND BACKGROUND

This invention relates to a novel process for the construction of electrodes for use in an electrochemical device. More particularly, the invention embraces a process for the construction of low thickness, lightweight fuel cell electrodes comprising an electrocatalyst and hydrophobic binder.

The advantages of lightweight electrodes for use in fuel cells have been recognized. These electrodes essentially comprise an admixture of electrocatalyst and hydrophobic binder deposited on a substrate material such as a porous carbon or metal support, wire mesh or grid. The electrodes are extremely thin, having low internal electrical resistance and furthermore, take up only limited space permitting the construction of highly compact cells having a high energy to volume and energy to weight ratio. One difficulty with these electrodes, however, is obtaining a controlled distribution of electrocatalyst particles with the hydrophobic polymer particles throughout the electrode structure. Further, it is difficult to obtain reproducibility in the electrodes particularly when employing either relatively heavy or light loadings of catalyst.

SUMMARY OF THE INVENTION

It is proposed to overcome the deficiencies of the prior art methods of constructing lightweight catalyst/hydrophobic polymer electrodes by carefully controlling the colloidal chemistry of an aqueous suspension of catalyst particles and hydrophobic polymer particles during the application of the suspension to a conductive substrate. It has been found that by controlling the colloidal chemistry of the aqueous suspension of metal catalyst particles and binder, as for example by the addition of acids, bases, or salts to adjust the pH, the amount of binder adsorbed to the catalyst particles during the deposition step is fixed, which in turn establishes the rate of deposition and distribution of catalyst and binder in the electrode structure. Such electrodes have an improved electrochemical performance; and, furthermore, the decay characteristics of the resultant electrode when utilized in a fuel cell are improved.

It is not clear exactly what occurs in the fabrication of the electrodes as a result of controlling the colloid interactions of the component particles of the aqueous suspension during deposition. It is theorized, however, that by controlling the colloid interactions—i.e., by adjusting the surface charges of the electrocatalyst and binder particles—the zeta potential of the suspended particles is altered, thereby altering the diffusion layer of these particles and the interaction between them. The colloid interactions of the particles in the aqueous suspension can be controlled by adjusting the ionic strength of the aqueous suspension by addition of acids such as phosphoric acid, i.e., by lowering the pH of the aqueous suspension to as low as about pH 1.5 up to about 6.0 and preferably in the range of 1.5 to 4.0; or by addition of an alkali, i.e., by raising the pH of the aqueous suspension to a pH above about 10 and preferably in the range of from 10 to 12. The increase in pH can be accomplished with any alkaline material including potassium hydroxide, sodium hydroxide, calcium hydroxide, barium hydroxide, or the like, as well as ammonia. Generally, the pH can be adjusted upward with ammonia or any of the alkali or alkaline earth metal hydroxides. The acid used for lowering the pH, in addition to phosphoric acid, can be any of the mineral acids such as hydrochloric, sulfuric, nitric, and the like.

In carrying out the invention, an intimate admixture of electrocatalyst metal particles and hydrophobic polymer particles is made up as an aqueous suspension. As used herein the phrase "aqueous suspension" means a suspension in water. In the usual construction, the catalyst metal/polymer admixture will contain from about 70 to 40 weight percent metal and from 30 to 60 weight percent polymer. The optimum percentage for supported electrocatalyst is from about 45 to 55 percent supported electrocatalyst and from 55 to 45 percent polymer, again on a weight basis. Such ratios of polymer to electrocatalyst are conveniently formed into an aqueous suspension using colloidal polymer particles and metal blacks. The pH of the suspension, or the ionic strength of the suspension is adjusted by adding the acid, base, or salt to obtain the desired pH. This causes the suspension to flocculate. Once this is done, the flocculate can be applied to a suitable substrate such as a porous metal or carbon substrate, or a wire grid or mesh by any of various techniques including filtration, spraying, or by forming a paste or the like with the flocculate and applying the paste to the substrate with a flat knife-like surface, doctor blade, or similar means. Preferably, the electrode is heated to a temperature sufficient to remove any surfactant which may be in the flocculate and to sinter the catalyst/polymer layer. Since the sintering temperature of the polymer is always sufficiently high to volatilize the surfactant, this can be accomplished in a single step. The sintering temperature of polytetrafluoroethylene (PTFE) is, for example, about 320° C. The catalyst/polymer flocculate preferably will be applied to the support at a catalyst loading of from about 0.05 mg/cm$^2$ up to about 10 mg/cm$^2$. Normally, as low a catalyst loading as possible for any particular application is desired due to the expense of the catalyst. It is possible to use catalyst loadings outside the above range, however, up to as high as about 35 mg/cm$^2$ of electrode surface and higher, but normally this is not necessary or desirable. In accordance with the present invention, the amount of catalyst utilized can be lowered, due to the uniform distribution of catalyst and as a result of the improved utilization characteristics of the electrode.

The substrates particularly useful herein are metal screens, expanded metal, porous sinters of carbon or metal, metal felt, or mesh. It is essential that the structure be electrically conductive and able to withstand the corrosive environment of a fuel cell. Suitable metal supports are from about 0.5 to 1 millimeter thick having a high porosity, i.e. from 35 to 90 percent, and preferably are composed of nickel, copper, iron, titanium, tantalum, silver, gold and alloys thereof, primarily from the standpoint of the exceptional resistance of these materials to the corrosive environment of the fuel cell.

It is also contemplated that the catalyst may first be deposited on a suitable particulate support, such as carbon particles, and the supported catalyst then flocculated with the polymer by the method of the present invention and applied to the substrate.

The polymer which is to be utilized in accordance with the present invention must be relatively hydrophobic. Exemplary polymers include polytetrafluoroethylene, polytrifluorochloroethylene, polyvinylfluoride, polyvinylidenefluoride, polytrifluoroethylene, polyfluoroethylenepropylene, perfluoroalkoxypolyethylene, and co-polymers thereof. However, because of its exceptional hydrophobicity as well as its resistance to heat and the corrosive environment of the electrolyte, polytetrafluoroethylene is preferred.

The electrochemically active metal which is to be applied to the metal support as a suspension with the hydrophobic polymer can be any of various metals which will favorably influence an electrochemical reaction. Such metals include nickel, iron, gold, copper, palladium, platinum, rubidium, ruthenium, osmium, and iridium, and alloys thereof. Because of their exceptional properties insofar as favorably influencing an electrochemical reaction, the Group VIII metals of Mendeleyev's Periodic Table are preferred. The most desirable metal is platinum. The electrodes prepared by the process of the present invention can be employed in various types of fuel cells including those using alkaline and acid electrolytes. Alkaline electrolytes are preferably the alkali metal hydroxides, but can include the alkaline earth hydroxides as well as the alkaline earth carbonates. Preferred alkaline electrolytes are potassium, sodium, rubidium, and cesium hydroxides. The strong mineral acids such as phosphoric acid, sulfuric acid, and hydrochloric acid and organic acids such as trifluoromethanesulfonic acids or polymers thereof are the preferred acid electrolytes. Preferably, the electrodes are employed in acid or alkaline electrolyte fuel cells wherein the electrolyte is trapped or contained in a hydrophilic matrix; however, they could also be used in cells operating with a free electrolyte. Such cells are normally operated from ambient to about 220° C using oxygen or air as the oxidant, and hydrogen or hydrocarbons as the fuel.

The following specific examples are illustrative of this invention:

EXAMPLE 1

A suspension containing 30 percent colloidal polytetrafluoroethylene and 70 percent platinum black in water is prepared by admixing platinum black powder and TFE 30 Teflon in an aqueous medium. TFE 30 Teflon from Dupont Corporation, Delaware, Maryland, Is a form of PTFE stabilized with a surfactant. Thereafter, the pH of the medium is adjusted to 2 by adding phosphoric acid with uniform stirring to form a flocculate. The flocculate is filtered onto a gold grid to provide an electrode A with a catalyst loading on the grid of 4 mg/cm$^2$. The structure is rolled lightly and heated to about 280° C to remove the surfactant and then to 310° C to sinter the catalyst/polymer layer.

A second electrode B is prepared as above, but in this instance the pH is not adjusted by adding phosphoric acid. The relative half-cell performance of the two electrodes at 275° F using 96% H$_3$PO$_4$ and air as the oxidant is as follows:

| ELECTROCHEMICAL PERFORMANCE (mv) | | | |
| --- | --- | --- | --- |
| Electrode | 100 ASF | 300 ASF | 500 ASF |
| A | 793 | 646 | 498 |
| B | 670 | 435 | — |

(ASF equals amps per square foot)

EXAMPLE 2

A noble metal catalyst comprising 90 percent platinum and 10 percent palladium is admixed with TFE 30 Teflon and suspended in water to provide a suspension containing 80 percent noble metal and 20 percent polymer. The pH of this suspension is adjusted to 11 by adding ammonium hydroxide with uniform stirring to form a flocculate. The flocculate is sprayed onto a silver screen, rolled lightly, and heated to about 280° C to remove the surfactant and then to 310° C to sinter the catalyst/polymer layer. The catalyst loading is 4 mg/cm$^2$.

A second electrode is made in the identical fashion as the first electrode, but in this instance the pH of the suspension is not adjusted to 11. When the electrodes made in accordance with the above invention are utilied in a fuel cell operated at 180° F utilizing a 30 percent potassium hydroxide electrolyte and fed with hydrogen and oxygen, the performance characteristics are as set forth in the current voltage curve as shown in the drawing. In the drawing, the curve with the squares is the pH controlled electrode. As is apparent, the electrode having the pH adjusted to 11 performs at a consistently higher current density at a given voltage over the range of 200 to 2,000 amps per square foot.

EXAMPLE 3

A catalyst supported on carbon particles comprises 10% platinum and 90% carbon is dispersed in an aqueous solution of TFE 30 and is admixed; the combined suspension is ultrasonically blended. The overall composition, by weight, excluding the water, is 5% platinum, 50% carbon, and 45% TFE 30. The pH of the suspension is adjusted to 3 using nitric acid. When the mixture is stirred the catalyst/Teflon suspension completely flocs and settles out of suspension. This floc is filtered onto a Teflon wetproofed carbon paper substrate to produce a platinum loading of 0.25 mg/cm$^2$. The electrode is then dried, rolled, and sintered at 660° F for 15 minutes.

A second electrode is made in the identical fashion as the first electrode, but the pH is not adjusted. Although flocculation is not complete, the same sequence of steps is used to fabricate this second electrode as was used to fabricate the first electrode. The performance of these electrodes was evaluated in a half cell at 350° F using a 99% phosphoric acid electrolyte and air as the oxidant. At 200 amps/ft$^2$ the performance of the first electrode was 690 mv and the performance of the second electrode was 665 mv.

In the above examples the metal support screen can be replaced with other metal supports with equivalent results. Additionally, the metal of the catalytic layer can be replaced with other electrochemically active materials. The hydrophobic polymer can be replaced with other polymers as hereinbefore mentioned. Further, the proportions of catalyst and binder can be adjusted over a relatively large range.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of our invention, that which we claim as new and desire to secure by Letters Patent of the United States is:

1. The method of constructing a stabilized fuel cell electrode comprising the steps of forming a uniform aqueous suspension of electrocatalyst particles and hydrophobic polymer particles; adjusting the pH of said suspension to a range of from pH 1.5 to pH 6, or from a range of pH 10 to pH 12 to form an electrocatalyst-/polymer flocculate; and fabricating said flocculate into a fuel cell electrode.

2. The method of claim 1 wherein the hydrophobic polymer is polytetrafluoroethylene.

3. The method of claim 2 wherein the electrocatalyst is platinum.

4. The method of claim 2 wherein the pH is adjusted to substantially a pH of 2 using an acid.

5. The method of claim 2 wherein the pH is adjusted to a pH of substantially 11 using a base.

6. The method of claim 1 wherein the pH is adjusted to a range of from pH 1.5 to pH 4.0.

7. The method of claim 2 wherein said step of fabricating includes spraying said flocculate onto a conductive support.

8. The method of claim 2 wherein said step of fabricating includes filtering said flocculate onto a conductive support.

9. The method of claim 4 wherein the acid is phosphoric acid.

10. The method of claim 5 wherein the base is ammonium hydroxide.

11. The method of constructing a fuel cell electrode comprising the steps of forming a uniform aqueous suspension of platinum supported on carbon particles and particles of polytetrafluoroethylene stabilized with a surfactant; adjusting the pH of said suspension to a range of from pH 1.5 to pH 4.0, or from a range of pH 10 to pH 12 to form a supported platinum/polytetrafluoroethylene flocculate; and fabricating said flocculate into a fuel cell electrode including the steps of applying said flocculate to a conductive support to form a catalyst/polymer layer on said support and heating said electrode to remove the surfactant and sinter the catalyst/polymer layer.

* * * * *

UNITED STATES PATENT OFFICE
CERTIFICATE OF CORRECTION

PATENT NO. : 4,043,933
DATED : August 23, 1977
INVENTOR(S) : Richard D. Breault et al.

It is certified that error appears in the above-identified patent and that said Letters Patent are hereby corrected as shown below:

Col. 4, line 25, "utilied" should read --utilized--.

Claim 1, col. 5, line 10, delete "stabilized".

Claim 1, col. 5, line 11, after "a" insert --stabilized--.

Signed and Sealed this

Twenty-second Day of November 1977

[SEAL]

Attest:

RUTH C. MASON
Attesting Officer

LUTRELLE F. PARKER
Acting Commissioner of Patents and Trademarks